United States Patent Office 3,513,537

Patented May 26, 1970

3,513,537

METHOD OF MAKING A COMPOSITE SUPERCONDUCTING WIRE

John E. C. W. Williams, Cambridge, Mass., assignor to United Kingdom Atomic Energy Authority, London, England No Drawing. Original application Sept. 3, 1963, Ser. No. 306,346. Divided and this application Mar. 24, 1967, Ser. No. 625,574

Claims priority, application Great Britain, Sept. 7, 1963, 34,437/62

Int. Cl. H01v *11/00*

U.S. Cl. 29—599 12 Claims

ABSTRACT OF THE DISCLOSURE

A method of making a composite superconductive wire by providing a multiplicity of lengths of superconducting material in a ductile, non-superconducting material, and swaging and/or drawing the non-superconducting material to form a wire in which the superconducting material has been reduced to filaments of small enough diameter to remain superconductive in a magnetic field in excess of the critical field.

CROSS-REFERENCE TO RELATED APPLICATION

Division of application Ser. No. 306,346 filed Sept. 3, 1963, now abandoned.

BACKGROUND OF THE INVENTION

This invention relates to superconducting wire.

The theory of superconductivity predicts that fine filaments of superconducting material (less than about 0.1 micron in diameter) should be capable of carrying a high current density (up to $2.10^8$ amps per square cm.) in magnetic field strengths appreciably in excess of the thermodynamic critical field. However, the difficulties of drawing and handling such filaments has hitherto prevented the practical realisation of the theory.

SUMMARY OF THE INVENTION

A superconducting wire made according to the present invention comprises a carrier and at least one inclusion, each inclusion being a continuous filament of superconducting material of small enough diameter to exhibit superconductivity in a magnetic field of a strength in excess of the thermodynamic critical field and the carrier being of a material and of a diameter capable of being drawn by wire drawing techniques.

The inclusions may be elemental in which case they are preferably of niobium, although other superconducting materials such as vanadium or lead may be used. Alternatively the inclusions may be alloyed, for example they may be an alloy of niobium and zirconium. The carrier material should be compatible with the filament material, and if the wire is to be annealed at any stage there must not be significant diffusion of the inclusion into the carrier or vice versa.

The carrier material is not necessarily electrically conducting, but it is preferably non-magnetic and it must not be superconducting at the temperature the wire is to be used. It is preferable for the carrier to be an inhibitor of superconductivity and a preferred material is molybdenum.

DESCRIPTION OF THE PREFERRED EMBODIMENTS

Two methods of making superconducting wires in accordance with the present invention will now be described by way of example.

In the first method a cylindrical billet of molybdenum about 4 inches in diameter is formed with say 100 equally spaced axial holes which are plugged with rods of niobium. The diameter of each rod is 0.04 inch, and they may simply be inserted in drilled holes in the billet. The composite billet is then reduced in diameter by swaging and/or drawing down to about 0.0005 inch, so that the inclusions are then filaments having a diameter of about 0.000005 inch.

The process may be continued by cutting the wire into lengths, laying the lengths parallel to make a bundle, which may then be sheathed by extruding molybdenum over it, and swaging and/or drawing the bundle to reduce the diameter further. This step may be repeated a number of times until, say, the resulting wire is 0.02 inch in diameter and has $10^8$ inclusions.

In the second method a bundle is first made up from a large number of niobium wires which have been electroplated with molybdenum. A sheath of molybdenum is extruded over the bundle, and the whole then reduced in diameter as described above.

Although only niobium and molybdenum have been referred to in the particular examples, other materials may be satisfactorily used subject to the limitations mentioned above. The best results are however obtained where the carrier material is an inhibitor of superconductivity, as is impure molybdenum, or is an insulator. This is because if the carrier material is merely not superconducting, as for example copper, there is a tendency when a very fine composite wire has been made for the carrier material in the immediate region of an inclusion to show superconducting properties. This has the effect of making the effective diameters of the filaments greater than their actual diameters, so reducing the maximum magnetic field strength in which the composite wire will have superconducting properties.

I claim:

1. A method of making a composite superconductive wire comprising the steps of providing a plurality of lengths of a material which is superconducting at the temperature at which the wire is to be used within a compatible non-magnetic carrier material which is not superconducting at said temperature, such that each length of superconductive material is surrounded by carrier material and reducing the cross-sectional area of the carrier material and the included superconductive material by swaging and/or drawing to form a wire, said reduction being continued until the superconductive material is reduced to filaments of small enough diameter to exhibit superconductivity in a magnetic field in excess of the bulk critical magnetic field for that material, the two materials being so related that there would not be significant diffusion of one into the other if the assembly is annealed at any stage.

2. A method in accordance with claim 1, wherein said carrier material is electrically conducting.

3. A method in accordance with claim 2, wherein said carrier material is molybdenum.

4. A method in accordance with claim 1, wherein said superconductive material is niobium.

5. A method in accordance with claim 1 wherein said carrier material is initially in the form of a cylindrical billet in which are drilled a plurality of axially-extending holes into which are placed said lengths of superconductive material.

6. A method of making a composite superconductive wire comprising the steps of providing a plurality of lengths of a material which is superconducting at the temperature at which the wire is to be used each within a compatible non-magnetic carrier material which is not superconducting at said temperature, grouping a plurality of said lengths together into a bundle, and reducing the cross-sectional area of the bundle by swaging and/or drawing until the superconductive material is reduced to filaments of small enough diameter to exhibit superconductivity in a magnetic field in excess of the bulk critical magnetic field for that material, the two materials being so related that there would not be significant diffusion of one into the other if the assembly is annealed at any stage.

7. A method in accordance with claim 6 wherein said bundle of lengths is provided with a sheath of said carrier material prior to the sheathed bundle being reduced.

8. A method in accordance with claim 6 wherein said carrier material is electrically conducting.

9. A method in accordance with claim 8 wherein said carrier material is molybdenum.

10. A method in accordance with claim 6 wherein said carrier material is an inhibitor of superconductivity.

11. A method in accordance with claim 6 wherein the superconductive material is niobium.

12. A method of making a composite superconductive wire comprising the steps of providing a plurality of lengths of an elemental material which is superconducting at the temperature at which the wire is to be used within a molybdenum carrier material which is not superconducting at said temperature, and reducing the cross-sectional area of the carrier material and the included superconductive material by swaging and/or drawing to form a wire, said reduction being continued until the superconductive material is reduced to filaments of small enough diameter to exhibit superconductivity in a magnetic field in excess of the bulk critical magnetic field for that material, but no greater than 0.1 micron in diameter.

References Cited

UNITED STATES PATENTS

| | | | |
|---|---|---|---|
| 3,029,496 | 4/1962 | Levi. | |
| 3,109,963 | 11/1963 | Geballe. | |
| 3,218,693 | 9/1965 | Allen et al. | 29—599 |
| 3,239,919 | 3/1966 | Levi. | |
| 3,370,347 | 2/1968 | Garwin et al. | 29—599 |
| 3,162,943 | 12/1964 | Wong | 29—423 |

PAUL M. COHEN, Primary Examiner

U.S. Cl. X.R.

29—419, 195; 174—115